United States Patent
Muthiah et al.

(10) Patent No.: US 11,550,487 B2
(45) Date of Patent: Jan. 10, 2023

(54) DATA STORAGE DEVICE AND METHOD FOR ENABLING ENDURANCE RE-EVALUATION

(71) Applicant: Western Digital Technologies, Inc., San Jose, CA (US)

(72) Inventors: Ramanathan Muthiah, Bangalore (IN); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/180,006

(22) Filed: Feb. 19, 2021

(65) Prior Publication Data
US 2022/0197532 A1 Jun. 23, 2022

Related U.S. Application Data

(60) Provisional application No. 63/126,881, filed on Dec. 17, 2020.

(51) Int. Cl.
*G06F 3/06* (2006.01)

(52) U.S. Cl.
CPC ............ *G06F 3/0647* (2013.01); *G06F 3/065* (2013.01); *G06F 3/0619* (2013.01); *G06F 3/0635* (2013.01); *G06F 3/0656* (2013.01); *G06F 3/0673* (2013.01)

(58) Field of Classification Search
CPC .... G06F 3/0647; G06F 3/0619; G06F 3/0635; G06F 3/065; G06F 3/0656; G06F 3/0673
See application file for complete search history.

(56) References Cited

U.S. PATENT DOCUMENTS

| 7,353,334 | B2 * | 4/2008 | Horn ................... G06F 12/0866 711/170 |
| 7,561,466 | B2 | 7/2009 | Roohparvar |
| 8,819,304 | B2 | 8/2014 | Shapiro et al. |
| 8,996,959 | B2 | 3/2015 | Jung et al. |
| 9,256,542 | B1 * | 2/2016 | Flower ................... G06F 3/0649 |
| 9,584,395 | B1 * | 2/2017 | Rapoport ............ G06F 11/3452 |
| 2008/0109612 | A1 | 5/2008 | Jones |
| 2012/0284574 | A1 | 11/2012 | Avila et al. |
| 2015/0193302 | A1 * | 7/2015 | Hyun ................... G11C 29/028 714/764 |
| 2018/0129439 | A1 * | 5/2018 | Johnson ................ G06F 3/0658 |
| 2019/0310913 | A1 | 10/2019 | Helmick et al. |

OTHER PUBLICATIONS

NVM Express™ Base Specification, Revision 1.4 Next; NVM Express, Inc.; Jul. 21, 2020; 479 pages.

* cited by examiner

*Primary Examiner* — Jason W Blust
(74) *Attorney, Agent, or Firm* — Crowell & Moring LLP

(57) ABSTRACT

A data storage device and method for enabling endurance re-evaluation are provided. In one embodiment, a data storage device is provided comprising a memory and a controller. The controller is configured to receive data and a first storage requirement for the data from a host; store the data in a first group of memory cells in the memory, wherein the first group of memory cells satisfies the first storage requirement; receive a notification from the host that the first storage requirement has changed to a second storage requirement; and move the data from the first group of memory cells to a second group of memory cells in the memory, wherein the second group of memory cells satisfies the second storage requirement. Other embodiments are provided.

20 Claims, 7 Drawing Sheets

DATA STORAGE DEVICE AND METHOD FOR ENABLING ENDURANCE RE-EVALUATION

CROSS-REFERENCE TO RELATED APPLICATION

This application claims the benefit of U.S. provisional patent application No. 63/126,881, filed Dec. 17, 2020, which is hereby incorporated by reference.

BACKGROUND

A host can store data in and retrieve data from a memory in a data storage device. Data storage devices that operate under the Non-Volatile Memory Express (NVMe) specification enable a host to group data to be stored in the memory according to an endurance requirement. This enables a host to segregate data from various ones of its applications and stream the segregated data to the appropriate storage endurance group in the memory (e.g., data that requires high endurance is streamed to high endurance memory cells, while data that requires low endurance is streamed to low endurance memory cells).

DETAILED DESCRIPTION

Overview

Figure 1A:
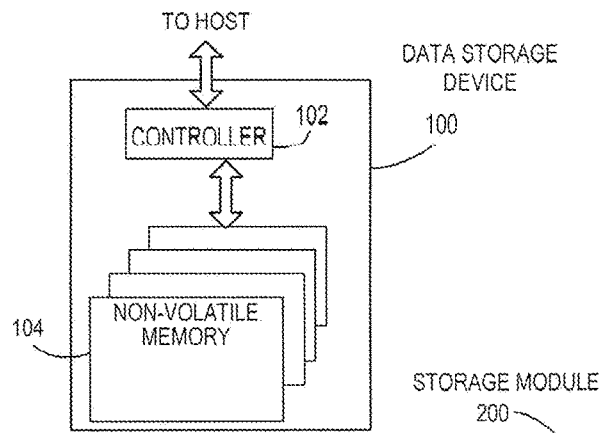
FIG. 1A is a block diagram of a data storage device of an embodiment.

By way of introduction, the below embodiments relate to a data storage device and method for enabling endurance re-evaluation. In one embodiment, a data storage device is provided comprising a memory and a controller. The controller is configured to receive data and a first storage requirement for the data from a host; store the data in a first group of memory cells in the memory, wherein the first group of memory cells satisfies the first storage requirement; receive a notification from the host that the first storage requirement has changed to a second storage requirement; and move the data from the first group of memory cells to a second group of memory cells in the memory, wherein the second group of memory cells satisfies the second storage requirement.

In some embodiments, the controller is further configured to move the data from the first group of memory cells to the second group of memory cells without transferring the data between the host and the data storage device.

In some embodiments, the controller is further configured to move the data from the first group of memory cells to the second group of memory cells by instructing the memory to perform an internal copy operation.

In some embodiments, the controller is further configured to move the data from the first group of memory cells to the second group of memory cells through a buffer in a controller of a different data storage device.

In some embodiments, the controller is further configured to send a suggestion to the host to re-evaluate the first storage requirement for the data.

In some embodiments, the notification from the host comprises a source logical address and a destination logical address of the data.

In some embodiments, the first and second storage requirements comprise endurance requirements.

In some embodiments, the first and second storage requirements comprise protection requirements.

In some embodiments, the first and second storage requirements comprise performance requirements.

In some embodiments, the memory comprises a three-dimensional memory.

In another embodiment, a method is provided that is performed in a host in communication with a data storage device comprising a memory. The method comprises determining a first storage requirement for data to be stored in the memory of the data storage device; sending the data and the first storage requirement to the data storage device; determining that the first storage requirement has changed to a second storage requirement; and informing the data storage device that the first storage requirement has changed to the second storage requirement.

In some embodiments, the method further comprises receiving confirmation from the data storage device that the data was moved from a first set of memory cells that satisfies the first storage requirement to a second set of memory cells that satisfies the second storage requirement; wherein the data is moved from the first set of memory cells to the second set of memory cells without transferring the data between the host and the data storage device.

In some embodiments, the method further comprises receiving a suggestion from the data storage device to re-evaluate the first storage requirement for the data.

In some embodiments, the host determines that the first storage requirement has changed to the second storage requirement in response to a change in an indication of importance of the data.

In some embodiments, the host determines that the first storage requirement has changed to the second storage requirement in response to an increase or decrease in access activity of the data.

In some embodiments, informing the data storage device comprises sending, to the data storage device, a source logical address and a destination logical address of the data.

In some embodiments, the first and second storage requirements comprise endurance requirements.

In some embodiments, the first and second storage requirements comprise protection requirements.

In some embodiments, the first and second storage requirements comprise performance requirements.

In another embodiment, a data storage device is provided comprising a memory; means for receiving data and a first storage requirement for the data from a host; means for storing the data in a first portion of the memory, wherein the first portion of the memory satisfies the first storage requirement; means for receiving a notification from the host that the first storage requirement has changed to a second storage requirement; and means for moving the data from the first portion of the memory to a second portion of the memory, wherein the second portion of the memory satisfies the second storage requirement.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
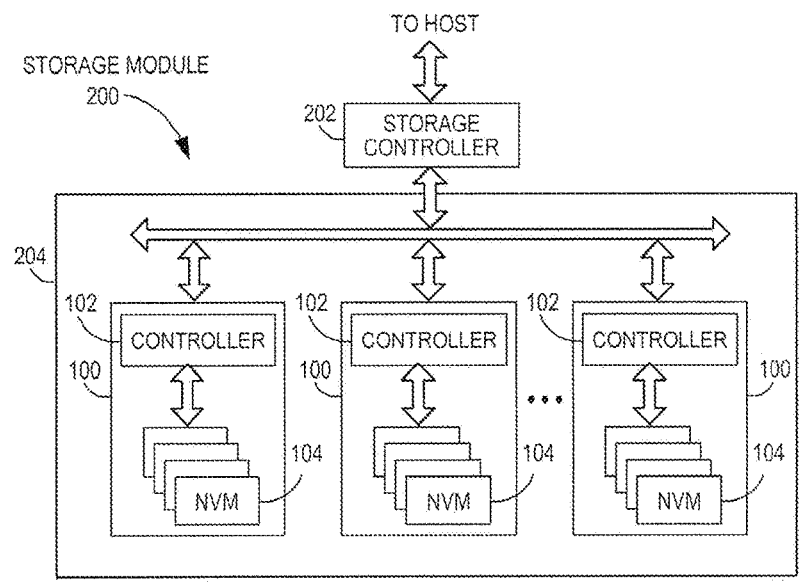
FIG. 1B is a block diagram illustrating a storage module of an embodiment.
Figure 1C:
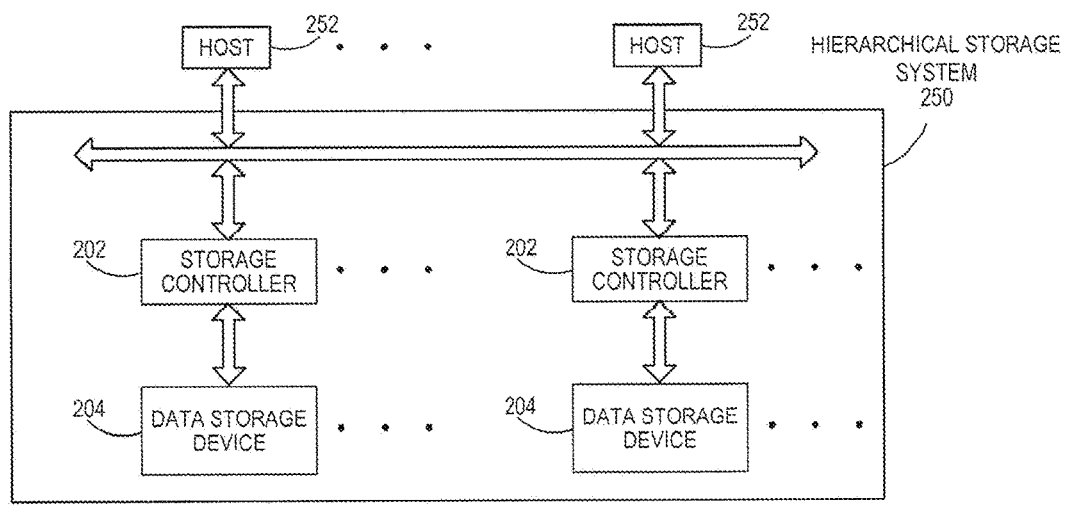
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
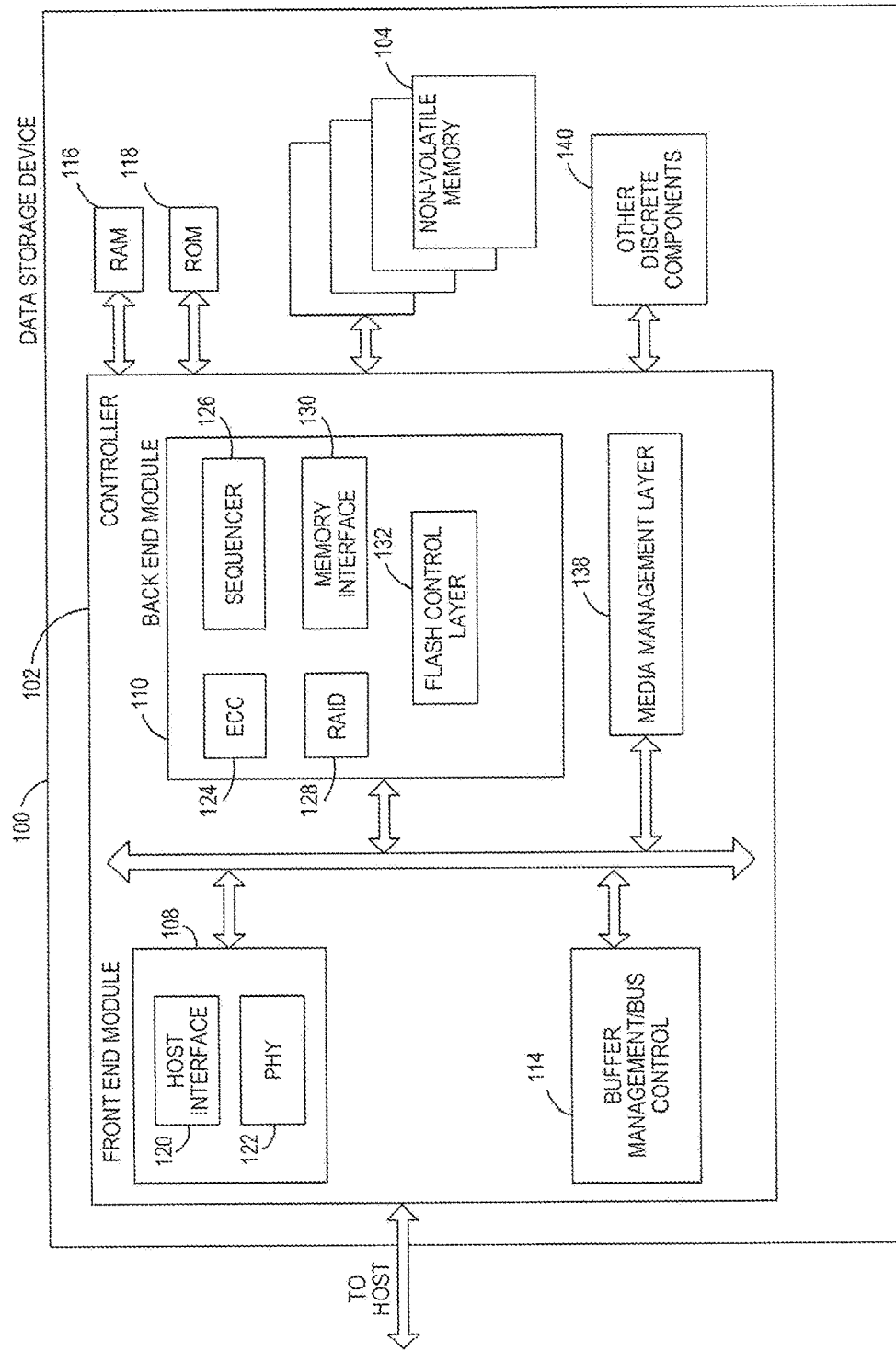
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
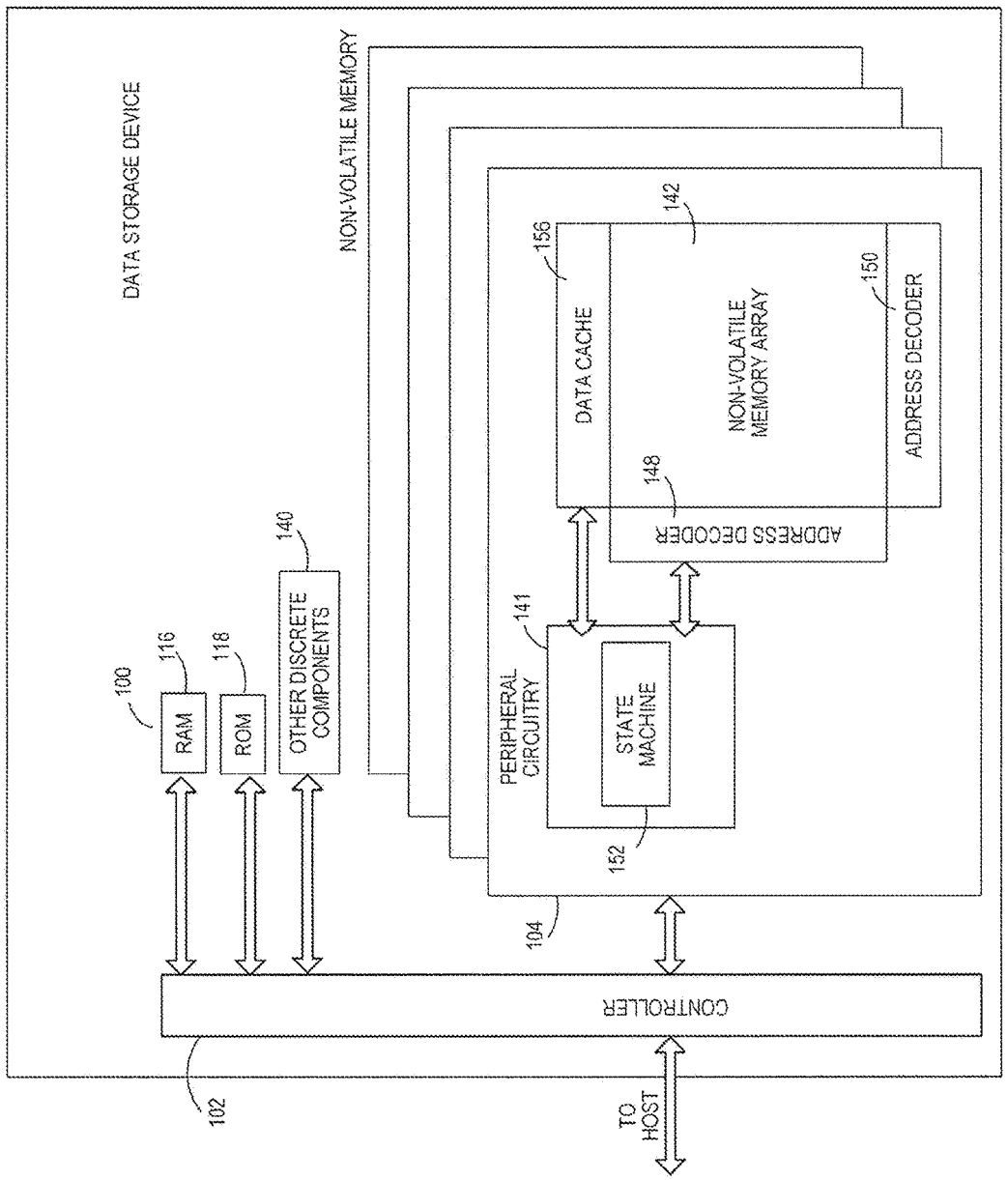
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
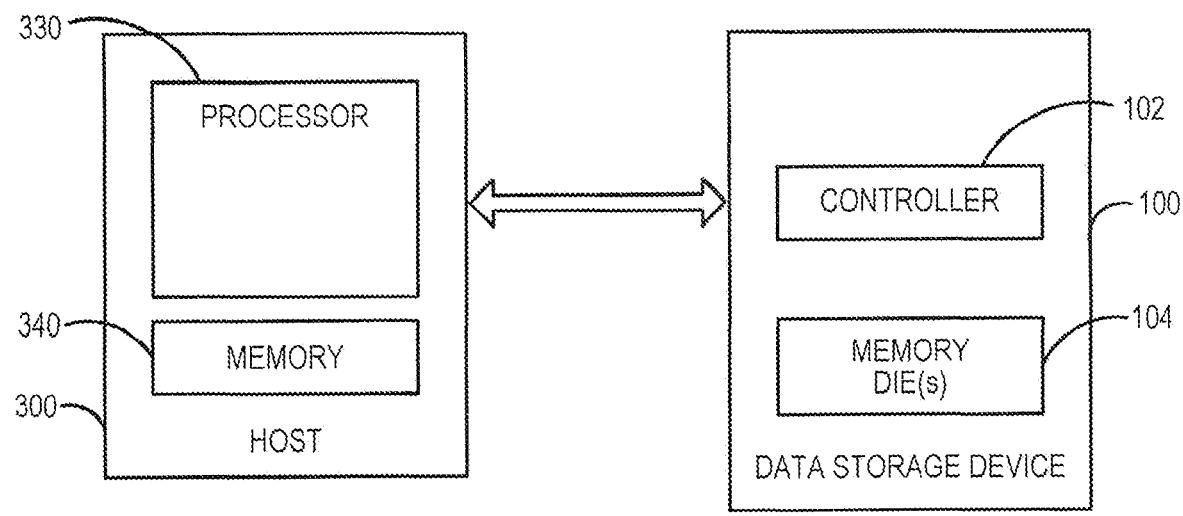
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

As mentioned above, a host can store data in and retrieve data from a memory in a data storage device. Data storage devices that operate under the Non-Volatile Memory Express (NVMe) specification enable a host to group data to be stored in the memory according to an endurance requirement. This enables a host to segregate data from various ones of its applications and stream the segregated data to the appropriate storage endurance group in the memory (e.g., data that requires high endurance is streamed to high endurance memory cells, while data that requires low endurance is streamed to low endurance memory cells). As used herein, an endurance group refers to a logical region of memory cells having similar endurance characteristics. For example, Endurance Group 1 and Endurance Group 2 can be two endurance groups with different endurance attributes. All the NVMe Sets and Namespaces within Endurance Group 1 have the endurance attribute of Endurance Group 1. Likewise, all NVMe Sets and Namespaces within Endurance Group 2 will have the endurance attribute of Endurance Group 2.

For some data, the decision on which endurance group the data belongs can be simple. For other data, the decision can be more difficult, and the host can perform learning to segregate data for endurance purposes. However, it is possible that the host's judgement on endurance grouping goes wrong. Further, if the host realizes that its initial judgement was wrong or if the endurance requirement of the data changes, the host can move the data from one endurance group to another in the memory by reading the data from the endurance group in which the data was stored and writing it back to another endurance group in the memory. However, this movement of data between the data storage device and host using read and write commands may not be optimal.

The following embodiments provide a mechanism to address this problem. In general, with these embodiments, the host 300 can re-evaluate the endurance requirement of data previously stored in the memory 104 of the data storage device 100. If the endurance requirement of the data has changed, the host 300 can issue a command to the data storage device 100 to move the data from one endurance group to the other without involving the host 300 in the data transfer. For example, the data transfer can be done as an internal copy operation in the memory 104, or the data can be transferred via another data storage device (e.g., in a controller memory buffer (CMB) in another data storage device). These embodiments provide a more-optimal data transfer than using standard read and write operations that transfer data back and forth between the host 300 and data storage device 100.

It should be noted that while the following paragraphs will present an example implementation in terms of endurance groups, other storage requirement groups can be used, such as, but not limited to, protection and performance. For example, the host 300 can stored the data in the memory 104 for a certain performance level, say some NVMe set. Later, based on need, the host 300 can decides to change the performance characteristics of that data to some other NVMe set. On similar lines, the protection requirements of the data can change, and the host 300 can accordingly decide to use a different destination logical address that has a different protection requirement.

Figure 4:
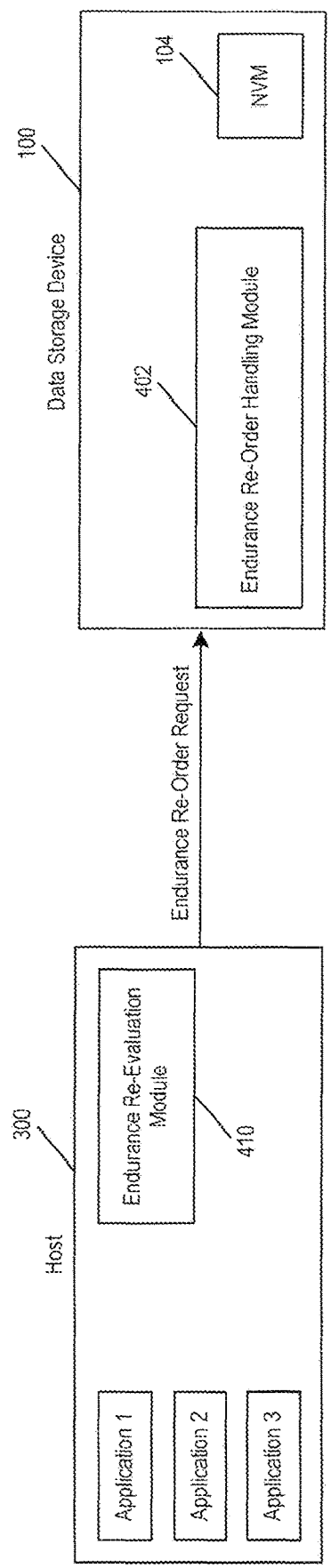
FIG. 4 is a block diagram of a host and data storage device of an embodiment, in which the host and data storage devices have modules related to endurance reordering.

Turning again to the drawings, FIG. 4 is a block diagram of a host 300 and data storage device 100 of an embodiment. As shown in FIG. 4, in this embodiment, the host 300 runs a plurality of applications (Applications 1, 2, and 3) (e.g., by the processor 330 executing computer-readable program code stored in the memory 340 (see FIG. 3)). The host 300 also comprises an endurance re-evaluation module 410, which can also be implemented as computer-readable program code executed by the processor 330. The endurance re-evaluation module 410 is configured to re-evaluate the endurance requirement that the host 300 initially determined from data generated by one or more of Application 1, 2, or 3. If the host 300 determines that the endurance requirement of previously-stored data has changed, the host 300 sends an endurance reorder request to the data storage device 100.

In this embodiment, the data storage device 100 has an endurance re-order handling module 402, which can be implemented by the controller 102 and is configured to transfer the data from the endurance group in the memory 104 that currently stores the data to a different endurance group in the memory 104. As noted above, this data transfer is done without involving the host 300 and can be performed, for example, during a copy operation in the memory 104 or using other data storage device(s) (e.g., using controller memory buffer(s) (CMB(s)) in one or more other data storage devices).

Figure 5:
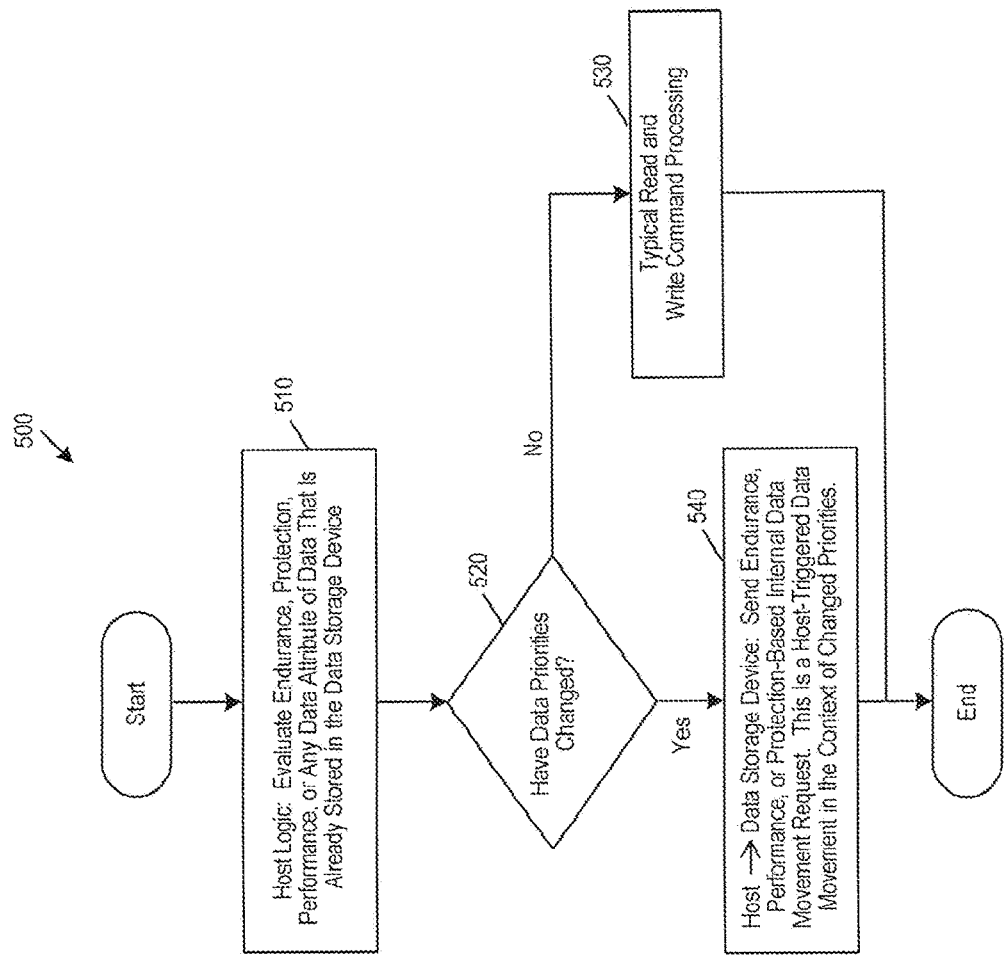
FIG. 5 is a flow chart of a method performed in a host of an embodiment for endurance re-evaluation.
Figure 6:
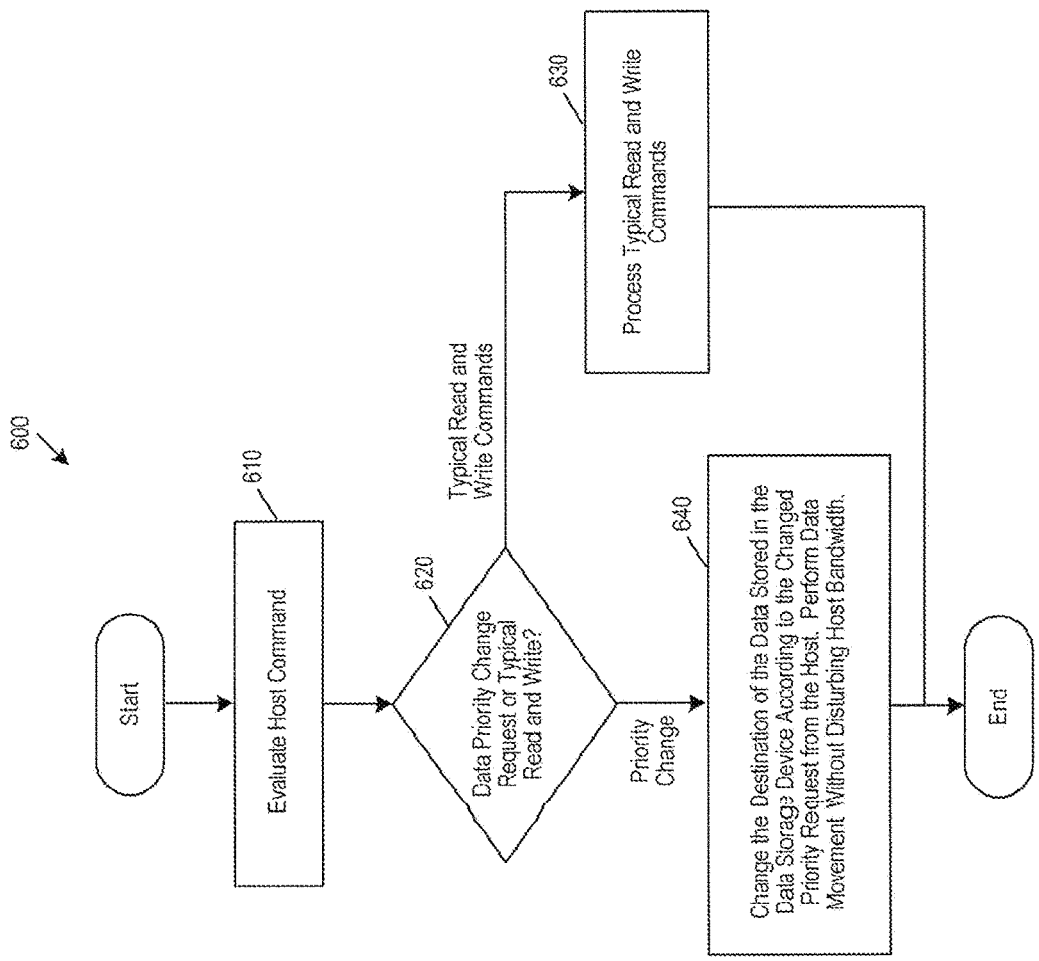
FIG. 6 is a flow chart of a method performed in a data storage device of an embodiment for endurance re-evaluation.

FIGS. 5 and 6 provide flow charts 500, 600 that illustrate these operations. FIG. 5 is a flow chart 500 of a method performed in the host 300 of an embodiment for endurance re-evaluation. As shown in FIG. 5, the host 300 evaluates a storage requirement (e.g., endurance, protection, performance, and/or other data attribute) that is already stored in the memory 104 of the data storage device 100 (act 510). Next, the host 300 determines if the data's priorities (storage requirements) have changed (act 520). If the storage requirements have not changed, the host 300 provides typical read and write commands (act 530). However, if the storage requirements have changed, the host 300 sends a request to the data storage device 100 to move the data to a different storage requirement group (act 540). This request can take any suitable form. For example, in one embodiment, the request contains a source logical address for the memory location currently storing the data and a destination logical address of the location that the data is to be stored to satisfy the new storage requirement. For example, the host 300 can instruct the data storage device 100 to move the data from one endurance group to another with a destination logical address configuration. That is, the host 300 can generate the destination logical ranges in the new endurance group after deciding on the source logical data. Both the destination and source logical range can be an input configuration for the data storage device 100 to take up the reordering activity.

FIG. 6 is a flow chart 600 of a method performed in the data storage device 100 of an embodiment for endurance re-evaluation. As shown in FIG. 6, when the data storage device 100 receives a command from the host 300, the controller 102 in the data storage device 100 evaluates the command (act 610) and decides whether the command is a priority change command or a typical read/write command (act 620). If the controller 102 determines that the command is a typical read/write command, the controller 102 processes the read/write command as it would usually do (act 630). However, if the controller 102 determines that the command is a priority change request, the controller 102 changes the destination stored in the memory 104 according to the request (act 640). For example, if the data is stored in a first group of memory cells in the memory 104 that satisfies the first storage requirement, the controller 102 can move the data to a second group of memory cells in the memory 104 that satisfies the different, second storage requirement.

As noted above, this data transfer is done without involving the host 300 and can be performed, for example, during a copy operation in the memory 104 or using other data storage devices (e.g., using controller memory buffer(s) (CMB(s)) in one or more other data storage devices). At the conclusion of the data transfer, the data storage device 100 can provide the host 300 with confirmation that the data was moved (e.g., the data storage device 100 can respond with a status update upon completion of endurance reordering).

As noted above, in this embodiment, the host 300 determines that the storage requirement (e.g., endurance) of data that was previously stored in the memory 104 of the data storage device 100 has changed since the host's initial assessment of the storage requirement. Storage requirements can change for a variety of reasons. For example, data logging performed from a sensor can be written to a low endurance group in the memory 104. When the host 300 later analyzes the log, the host 300 may determine that a portion of it is considered important and can request that portion be moved to a high endurance group in the memory 102. As another example, the host 300, based on a learned pattern, can initially determine that certain data will not be accessed frequently and store the data in cold storage. If the host 300 later determines that the some of the data is accessed extensively, the host 300 can re-evaluate the endurance requirement and take actions after a system threshold. Further, as physically moving data from one group to another can result in higher write amplification with decreased performance, the host 300 can have system margins based on memory resources and tighter thresholds to use this method cautiously.

There are many alternatives that can be used with these embodiments. For example, in one alternate embodiment, the controller 102 of the data storage device 100 is configured to send a suggestion to the host 300 to re-evaluate the storage requirement for the previously-stored data. This suggestion can be based on internal data storage device thresholds that are moving overall quality of service down due to specific logical block addresses (LBAs) being present in an endurance group and are causing more activity than desired. This can be the case, for example, if a journal, which is constantly updated, is stored in the same endurance group as read-intensive data. The data storage device 100 can perform autonomous cross endurance group copying to pre-designated areas and alert the host 300 when this is done, so that the host 300 can update its tables.

Also, as noted above, in one embodiment, the data storage device 100 moves the data from one storage requirement group to the other without involving the host 300 in the data transfer. This can be done, for example, by internally moving the data in the memory 104 or by transferring the data to a memory/buffer (e.g., a controller memory buffer (CMB)) of another data storage device. CMB enables peer-to-peer direct memory access transfers (p2pdma) and can be used with local (PCIe) or remote (fabrics) environments. It should be noted that using CMB for data copy is just an example and should not be construed as the only available method. For example, some data storage devices may use in-device buffers.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory comprising a first endurance group of memory cells and a second endurance group of memory cells, wherein the first endurance group of memory cells and the second endurance group of memory cells comprise different endurance attributes; and
a controller configured to:
receive a command from a host to store, in the first endurance group of memory cells, data that the host segregated from a plurality of applications on the host based on an endurance requirement;
store the data in the first endurance group of memory cells;
in response to the host determining that the endurance requirement has changed, receive an endurance reorder request from the host to move the data from the first endurance group of memory cells to the second endurance group of memory cells; and
in response to receiving the endurance reorder request move the data from the first endurance group of memory cells to the second endurance group of memory cells without transferring the data between the host and the data storage device.

2. The data storage device of claim 1, wherein the controller is further configured to send a confirmation to the host that the data was moved from the first endurance group of memory cells to the second endurance group of memory cells.

3. The data storage device of claim 1, wherein the controller is further configured to move the data from the first endurance group of memory cells to the second endurance group of memory cells by instructing the memory to perform an internal copy operation.

4. The data storage device of claim 1, wherein the controller is further configured to move the data from the first endurance group of memory cells to the second endurance group of memory cells through a buffer in a controller of a different data storage device.

5. The data storage device of claim 1, wherein the controller is further configured to send a suggestion to the host tore-evaluate the endurance requirement.

6. The data storage device of claim 1, wherein the endurance reorder request comprises a source logical address.

7. The data storage device of claim 1, wherein the endurance reorder request comprises a destination logical address.

8. The data storage device of claim 1, wherein the data is further segregated from the plurality of applications on the host based on protection requirements.

9. The data storage device of claim 1, wherein the data is further segregated from the plurality of applications on the host based on performance requirements.

10. The data storage device of claim 1, wherein the memory comprises a three-dimensional memory.

11. A method comprising:
performing the following in a host in communication with a data storage device comprising a memory, wherein the memory comprises a first endurance group of memory cells and a second endurance group of memory cells, each group comprising different endurance attributes:
segregating data from a plurality of applications on the host based on an endurance requirement;
sending a command to the data storage device to store the data in the first endurance group of memory cells;
determining that the endurance requirement has changed; and
in response to determining that the endurance requirement has changed, sending an endurance reorder request to the data storage device, wherein the endurance reorder request instructs the data storage device to move the data from the first endurance group of memory cells to the second endurance group of memory cells without transferring the data between the host and the data storage device.

12. The method of claim 11, further comprising:
receiving confirmation from the data storage device that the data was moved from the first endurance group of memory cells to the second endurance group of memory cells.

13. The method of claim 11, further comprising receiving a suggestion from the data storage device to re-evaluate the endurance requirement.

14. The method of claim 11, wherein the host determines that the endurance requirement has changed in response to a change in an indication of importance of the data.

15. The method of claim 11, wherein the host determines that the endurance requirement has changed in response to an increase or decrease in access activity of the data.

16. The method of claim 11, wherein the endurance reorder request comprises a source logical address.

17. The method of claim 11, wherein the endurance reorder request comprises a destination logical address.

18. The method of claim 11, wherein the data is further segregated from the plurality of applications on the host based on protection requirements.

19. The method of claim 11, wherein the data is further segregated from the plurality of applications on the host based on performance requirements.

20. A data storage device comprising:
a memory comprising a first endurance group of memory cells and a second endurance group of memory cells, wherein the first endurance group of memory cells and the second endurance group of memory cells comprise different endurance attributes;
means for receiving a command from a host to store in the first endurance group of memory cells, data that the host segregated from a plurality of applications on the host based on an endurance requirement;
means for storing the data in the first endurance group of memory cells;
means for receiving, in response to the host determining that the endurance requirement has changed, an endurance reorder request from the host to move the data from the first endurance group of memory cells to the second endurance group of memory cells; and
means for moving, in response to receiving the endurance reorder request, the data from the first endurance group of memory cells to the second endurance group of memory cells without transferring the data between the host and the data storage device.

* * * * *